United States Patent [19]

Ewing

[11] Patent Number: 5,236,749
[45] Date of Patent: Aug. 17, 1993

[54] BLISTER PACKAGE

[76] Inventor: William D. Ewing, P.O. Box 223, Tiverton, R.I. 02878

[21] Appl. No.: 801,276

[22] Filed: Dec. 2, 1991

[51] Int. Cl.⁵ .................... B65D 75/60; B32B 3/16
[52] U.S. Cl. .................... 428/35.2; 428/35.7; 428/137; 428/166; 428/178; 428/195; 428/483
[58] Field of Search .................... 428/35.2, 35.7, 483, 428/195, 137, 166, 178; 206/461–469, 470, 484, 532, 471

[56] References Cited

U.S. PATENT DOCUMENTS

| Re. 29,705 | 7/1978 | Compere | 206/469 |
|---|---|---|---|
| 3,476,239 | 11/1969 | Jacob | 206/461 |
| 3,630,346 | 12/1971 | Burnside | 206/461 |
| 3,861,076 | 1/1975 | Starr | 446/19 |
| 3,865,953 | 2/1975 | Peters | 426/124 |
| 3,874,556 | 4/1975 | Finkelston, Jr. | 220/306 |
| 3,887,072 | 6/1975 | Koremura | 206/484.1 |
| 3,901,000 | 8/1975 | Peters | 53/412 |
| 3,903,773 | 9/1975 | Furukawa | 83/208 |
| 3,921,805 | 11/1975 | Compere | 206/532 |
| 3,980,083 | 9/1976 | Elliott | 604/88 |
| 4,022,206 | 5/1977 | Hilleman et al. | 604/197 |
| 4,025,580 | 5/1977 | Taylor | 525/193 |
| 4,038,228 | 7/1977 | Taylor | 523/126 |
| 4,044,980 | 8/1977 | Cummins | 248/664 |
| 4,048,410 | 9/1977 | Taylor et al. | 525/61 |
| 4,051,306 | 9/1977 | Tobias et al. | 523/125 |
| 4,056,499 | 11/1977 | Taylor | 435/317.1 |
| 4,056,665 | 11/1977 | Taylor et al. | 204/157.15 |
| 4,076,872 | 2/1978 | Lewicki | 428/35.2 |
| 4,101,720 | 7/1978 | Taylor et al. | 523/126 |
| 4,115,619 | 9/1978 | Kurfman et al. | 428/336 |
| 4,145,863 | 3/1979 | Hannon | 53/509 |
| 4,166,533 | 9/1979 | Maitland | 206/266 |
| 4,172,914 | 10/1979 | Pestag et al. | 428/35.9 |
| 4,186,240 | 1/1980 | Matsuda et al. | 428/349 |
| 4,191,320 | 3/1980 | Taylor et al. | 229/3.5 R |
| 4,209,091 | 6/1980 | Lieberman | 206/333 |
| 4,211,326 | 7/1980 | Hein et al. | 206/484 |
| 4,211,329 | 7/1980 | Braverman | 206/461 |
| 4,211,822 | 7/1980 | Kurfman et al. | 428/412 |
| 4,211,852 | 7/1980 | Matsuda et al. | 525/240 |
| 4,219,987 | 9/1980 | Hannon | 53/427 |
| 4,236,637 | 12/1980 | Castner | 206/467 |
| 4,241,129 | 12/1980 | Marton et al | 428/216 |
| 4,263,364 | 4/1981 | Seymour et al. | 428/287 |
| 4,267,094 | 5/1980 | Huhn et al. | 523/201 |
| 4,275,544 | 6/1981 | Hisazumi et al. | 53/433 |
| 4,292,355 | 9/1981 | Bonis | 428/35.7 |
| 4,351,435 | 9/1982 | Elwert et al. | 206/379 |
| 4,358,492 | 11/1982 | Perkins et al. | 428/36.92 |
| 4,379,801 | 4/1983 | Weaver et al. | 428/220 |
| 4,444,310 | 4/1984 | Odell | 206/471 |
| 4,869,939 | 9/1989 | Santo | 428/35.2 |
| 4,938,462 | 7/1990 | Gould | 206/470 |

Primary Examiner—George F. Lesmes
Assistant Examiner—Rena L. Dye
Attorney, Agent, or Firm—Larson & Taylor

[57] ABSTRACT

A blister packaging system is disclosed that is a sheet/-film or sheet/sheet package designed to be easily recycled and may be of materials that have a high recycled content without degradation in performance. The blister package is composed of a thermoformed or vacuum-formed front blister made from polyethylene terephthalate (PET), PET-G or R-PET which may have a significant pre or post-consumer recycled content sealed to a back film or sheet made from polyethylene which may also have a significant pre or post consumer recycled content. The film or sheet back may be printed on either or both sides and is coated on one side with an adhesive which bonds to the blister in the filling/sealing process.

5 Claims, 1 Drawing Sheet

BLISTER PACKAGE

FIELD OF THE INVENTION

This invention relates generally to blister-type packages and more specifically to a recyclable blister package.

BACKGROUND OF THE INVENTION

The current practice in blister packages is to use a thermoformed front blister made from virgin material usually polyvinyl chloride (PVC) and a back made from SBS card stock, which is made from bleached wood fiber. This package does not use recycled materials and is virtually unrecyclable itself. There is no system in place that collects and separates the materials in the current package. Indeed, disposing of PVC may become even more problematic for the refuse and recycling authorities since incineration of PVC produces some hazardous byproducts such as HCL, dioxin and furon. The paperboard back of current blister packages while recyclable is not recovered because of the difficulty thereof, and the lack of systems to separate it from the PVC. The only safe disposal method for the current blister pack is the landfill.

In an attempt to relieve some of the burden on our landfills, degradable plastic containers have been suggested. These containers are made of a plastic resin which is designed to decompose when they are exposed to ultra-violet light, oxygen or temperature. U.S. patents that disclose this type of plastic resin include: U.S. Pat. Nos. 4,038,228; 4,025,580; 4,048,410; 4,056,499; 4,051,306; 4,056,665; 4,101,720; and 4,191,320. While all of these patents disclose degradable plastic resins used in packages, they do not solve the real problem of recycling these packages.

Recyclable materials have been incorporated into packages in the past, but most of these packages do not allow for the entire package to be recycled easily. For example, U.S. Pat. No. 4,022,206 (Hilleman et al.) discloses a package that has a triple layer material. The outer layer is a high density protective plastic such as polyethylene terephthalate, and is used to protect the bag from abrasions. The outer layer is bonded to a foil layer such as aluminum. The foil layer in turn is bonded to an inner layer of polyolefin material. While the elements of this bag are recyclable, the bag is designed in such a manner that recycling such a bag is not cost effective. Similarly, U.S. Pat. No. 3,921,805 (Compere); and U.S. Pat. No. 4,211,326 (Hein et al.) disclose the use of polythylene terephthalate in combination with other material.

Although polyethylene terephthalate (PET), PET-G or R-PET has been tried in blister packages before, it has never been designed into a package specifically to address the needs of disassembly and ease of recycling.

SUMMARY OF THE INVENTION

According to the invention, a blister package is provided which has the advantage of being made of recyclable material and also of being easily recycled after use.

The blister package is composed of a themoformed or vacuumformed front blister layer made from polyethylene terephthalate (PET), PET-G or R-PET which may have a significant pre or post-consumer recycled content. This front blister layer is sealed to a back film or sheet made from polyethylene (PE) which may also have a significant pre or post consumer recycled content. The film or sheet back may be printed on either or both sides and is coated on one side with an adhesive which bonds to the blister in the filling/sealing process.

The blister package is easily separated by the recycler into its two component parts, PET and PE, by means of existing machinery which through air classification and centrifugal action segregates the materials according to their different molecular weights. Because of the large difference in density between PET and PE the recycler can recover virtually pure quantities of materials from this blister package. This enhances the value of the material to the recycler and the overall environmental, and the economic value of the package in the market.

Other features and advantages of the invention will be set forth in, or apparent from, the following detailed description of the preferred embodiment of the invention.

BRIEF DESCRIPTION OF THE DRAWINGS

The single FIGURE is a cross-sectional side elevational view of a recyclable package constructed in accordance with a preferred embodiment of the present invention.

DETAILED DESCRIPTION OF THE PREFERRED EMBODIMENT

Figure 1:
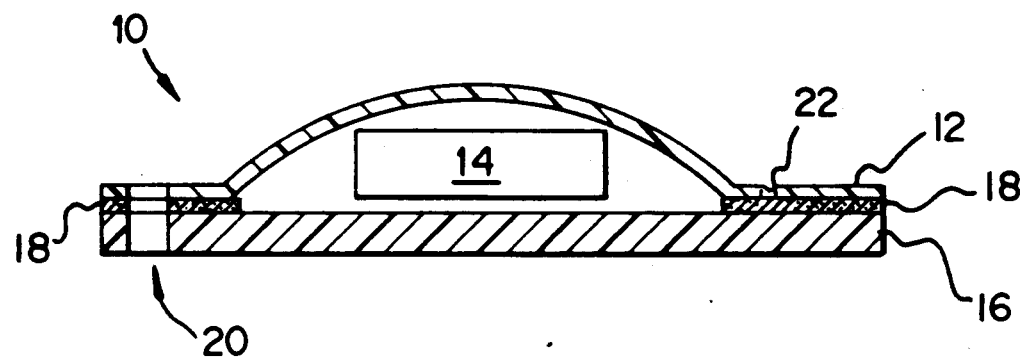

This invention relates to a blister package, generally denoted 10, that may be made from recycled material and/or easily recycled materials rather than a composite (PVC and Paperboard) which is not recyclable. The package consists of a front plastic blister layer 12 thermoformed or vacuumformed from a sheet of polyethylene terephthalate (PET). It will be appreciated that PET is used in beverage bottles and is collected and recycled in many locations. Recycled PET or R-PET is widely available and is used in a variety of products such as injection molded parts and fibers for making insulation in winter jackets. PET is easily shaped through thermoforming and in virgin form is already used in packaging of medical products and some food products. Preferably, blister layer 12 can be seen through so that a user may identify an item 14 which is stored in the package 10. An optional line of weakening 22 may be present in layer 12 to allow easier access to the item 14 in package 10.

The back layer 16 of the blister package 10 uses a polyethylene film or sheet which is printed on one or both sides. The back layer 16 may contain either or both pre or post consumer recycled resin. The material of back layer 16 is coated on one side with an adhesive layer 18 which bonds it to the PET blister on the filling-/sealing line. The blister package 10 may have an aperture 20 through layers 12, 16, and 18 to allow the package 10 to be displayed by hanging from a hook which engages the aperture 20.

The blister pack 10 is designed both to be made from recycled materials and to be itself as recyclable as a beverage bottle. Most recyclers reclaiming beverage bottles use hydrocyclone machinery to separate the PET from polyethylene or polypropylene found in the labels, basecaps and tops. Since recycling of PET beverage bottles and reclaiming of the plastic is widespread, the new invention is designed to conform to the current system. Because the R-PET from blister layer 12 has a significantly different density from the PE back layer 16, it separates well in the hydrocyclone, yielding two plastics of good purity and for which there are already markets for the recycled resins.

Although the present invention has been described relative to a specific exemplary embodiment thereof, it will be understood by those skilled in the art that variations and modifications can be effected in this exemplary embodiment without departing from the scope and spirit of the invention.

What is claimed is:

1. A recyclable blister package for an item comprising:
   a first sheet of polyethylene terephthalate having a blister which forms a compartment, said blister being adapted to receive an item;
   a back sheet of polyethylene closing and sealing said compartment formed by said first sheet and being secured by an adhesive layer to said first sheet around the periphery of said compartment, said adhesive layer removably attaching said back sheet to said first sheet with said item therebetween so as to facilitate recycling of said first and said back sheet.

2. The package recited in claim 1 and further including printed information on at least one side of said back sheet.

3. The package recited in claim 1 and further including an aperture in said back sheet and said first sheet for receiving a hook to suspend said package.

4. The package recited in claim 1 wherein said first sheet further comprises a line of weakening for allowing easy access to said item.

5. A recyclable blister package for an item comprising:
   a first sheet of polyethylene terephthalate having a blister which forms a compartment, said blister being adapted to receive an item, said first sheet further comprising a line of weakening for allowing easy access to said item;
   a back sheet of polyethylene having printed information on at least one side thereof closing and sealing said compartment formed by said first sheet and being secured by an adhesive layer to said first sheet around the periphery of said compartment, said adhesive layer removably attaching said back sheet to said first sheet with said item therebetween so as to facilitate recycling of said first and said back sheets.

* * * * *